J. H. & N. WEARE.
Culinary Vessels.

No. 154,305. Patented Aug. 18, 1874.

Attest
Edgar J. Gross
Edwin Anderson

Inventors
John H. Weare
Nathan Weare
By F. Millward
Attorney

THE GRAPHIC CO. PHOTO-LITH. 39 & 41 PARK PLACE, N.Y.

UNITED STATES PATENT OFFICE.

JOHN H. WEARE AND NATHAN WEARE, OF CINCINNATI, OHIO.

IMPROVEMENT IN CULINARY VESSELS.

Specification forming part of Letters Patent No. 154,305, dated August 18, 1874; application filed June 23, 1874.

*To all whom it may concern:*

Be it known that we, JOHN H. WEARE and NATHAN WEARE, both of Cincinnati, Hamilton county, State of Ohio, have invented certain new and useful Improvements in Culinary Utensils, of which the following is a specification:

Our invention relates to that class of cooking utensils adapted to fit the apertures of stove-tops, and so constructed as that the vapor arising from the boiling water and articles being cooked is carried down a side passage into the draft of the stove. Vessels heretofore constructed with such a vapor-vent have been of expensive construction, wasteful in use of material, and offering no facilities for cleaning. Our invention consists, in the first part, in so constructing the vessel that the vapor-vent is partly formed in the body of the vessel and partly formed by a detachable plate secured to the body of the vessel, the object of this being to provide for cheap manufacture of light material, either in sheet metal or cast metal, and also to so expose the surfaces, when the plate is removed, as to offer every facility for the necessary cleaning of the vessel. Our invention further consists in the provision of air-apertures in the detachable slide, to premote and regulate the current of vapors in the vent. Our invention further consists of a peculiar construction of a dumping-handle, (located necessarily upon the same side of the vessel as the vapor-vent, so that the contents may be emptied on the opposite side,) the handle being composed of a perforated spool and two bails, constituting a light, well-braced handle, by which the vessel may be dumped. Our invention still further consists, in connection with the vessel having a vapor-vent, of one or more perforations in the body of the vessel, opposite the vapor-vent, for the purpose of inducing a current of cold air across the entire diameter of the vessel under the lid, for the purpose of keeping the latter cool.

Figure 1:
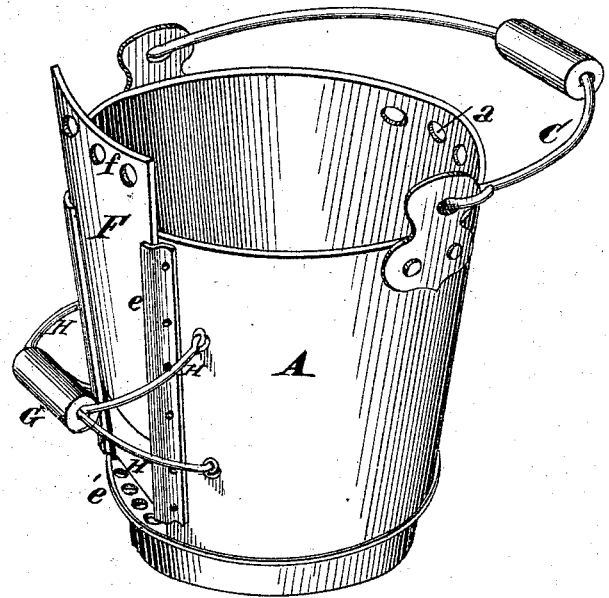
Figure 2:
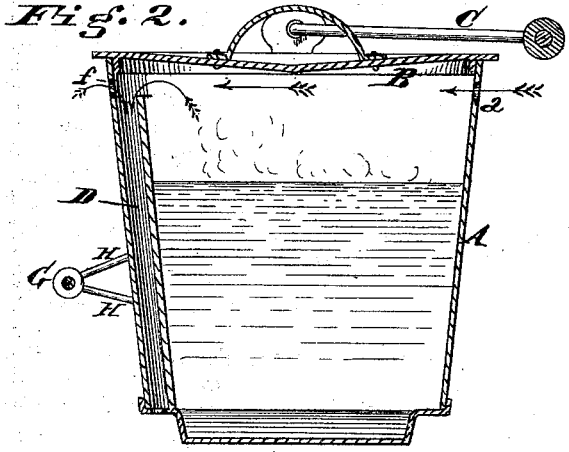
Figure 3:
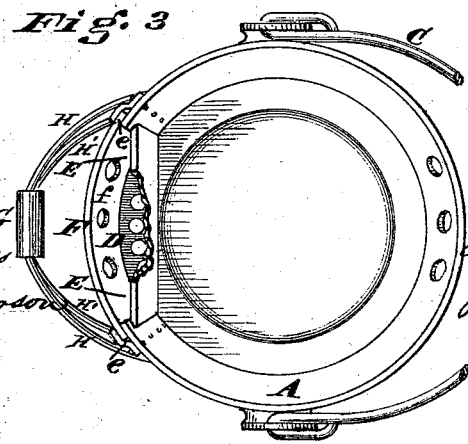

Figure 1 is a perspective view of the vessel, with the slide partly removed. Fig. 2 is a vertical section of the vessel and cover complete. Fig. 3 is a plan of the vessel, with cover removed.

A is the body of the vessel, made in the customary tapering form and fitted with a bottom of copper, or otherwise. The entire vessel may obviously be made of sheet metal, or may be cast bottom and sides in one piece, or it be a cast bottom secured to a sheet-metal body. B is the cover of the vessel, and C the ordinary bail. D is the vent passage or duct for the escape of the odorous vapor when the vessel is in use on a stove, the vapor, as it rises from the matter cooking in the vessel, passing off into the stove, from whence it is carried by the draft to the chimney. The vapor-vent is constructed as follows: The body of the vessel has formed upon one side of it a recess, E, having grooves $e$ in the sides, and may have a projecting plate, $e'$, perforated for the passage of the vapor downward into the stove. We prefer to use this plate $e'$ to properly support the slide, but it is obvious that it may be dispensed with. Into these grooves $e$ the slide or plate F is fitted in the manner shown, the space between it and the back of recess E constituting the width of vapor-vent. The length of the slide is equal to the length of the side of the vessel, minus the thickness of projection $e'$ when the latter is used. It is obvious that, owing to the vent being composed or formed as shown, that the coring of the vent, customary heretofore, (when the vessel is cast,) is avoided, and in consequence of the absence of coring, thin casting and easy molding is provided for, and, owing to the detachability of the slide F, every part of the vessel may be exposed for convenience of cleaning—a very important consideration. In order to properly carry off the vapors, and prevent them from passing through the joint of the cover, cold exterior air is admitted, and we have found that the most favorable place for accomplishing the desired result is at the upper edge of the detachable slide, for it is in direct and short communication with the duct at the commencement of the downward current, and to this end we perforate the top of the slide with perforations $f$. To assist also in the prevention of the rising vapors from passing through the cover, and for the additional purpose of keeping the cover cool, we introduce air at the perforation or perforations $a$, opposite to the vent D. In this class of vessels, where it is necessary that the contents should be poured off at a point opposite the vapor-vent, a stiff, yet cheap dumping-handle to the vessel is a desirable acquisition, and this we provide by combining the perforated wooden spool or handle G with the two bails H H', the outer ends of the bails being hooked to the vessel and the central part of both passing through the single aperture in the spool. This makes a very light, durable, and stiff handle for dumping purposes.

It is obvious that in place of the side of the vessel being specifically recessed, the grooves $e$ may be provided in the circular body of the vessel, and in lieu of the recess in the body, the recess may be sufficiently made in the slide F.

We claim—

1. The combination of vessel A B and detachable slide F, connected and operating to form a vapor-vent, D, substantially in the manner and for the purpose specified.

2. In combination with the vessel A B and slide F, the perforations $f$ in the slide, as and for the purpose specified.

3. In combination with the vessel A B D, the aperture or apertures $a$ in the side of the vessel, opposite to the passage D, substantially as and for the purpose stated.

4. The dumping-handle, composed of spool G and bails H H', substantially as and for the purpose specified.

In testimony of which invention, we hereunto set our hands.

J. H. WEARE.
      NATHAN WEARE.

Witnesses:
 EDGAR J. GROSS,
 J. L. WARTMANN.